July 27, 1965  J. S. WORK ETAL  3,197,195
INTERNAL EXPANDING LINE-UP PIPE CLAMP
Filed May 25, 1961  4 Sheets-Sheet 4

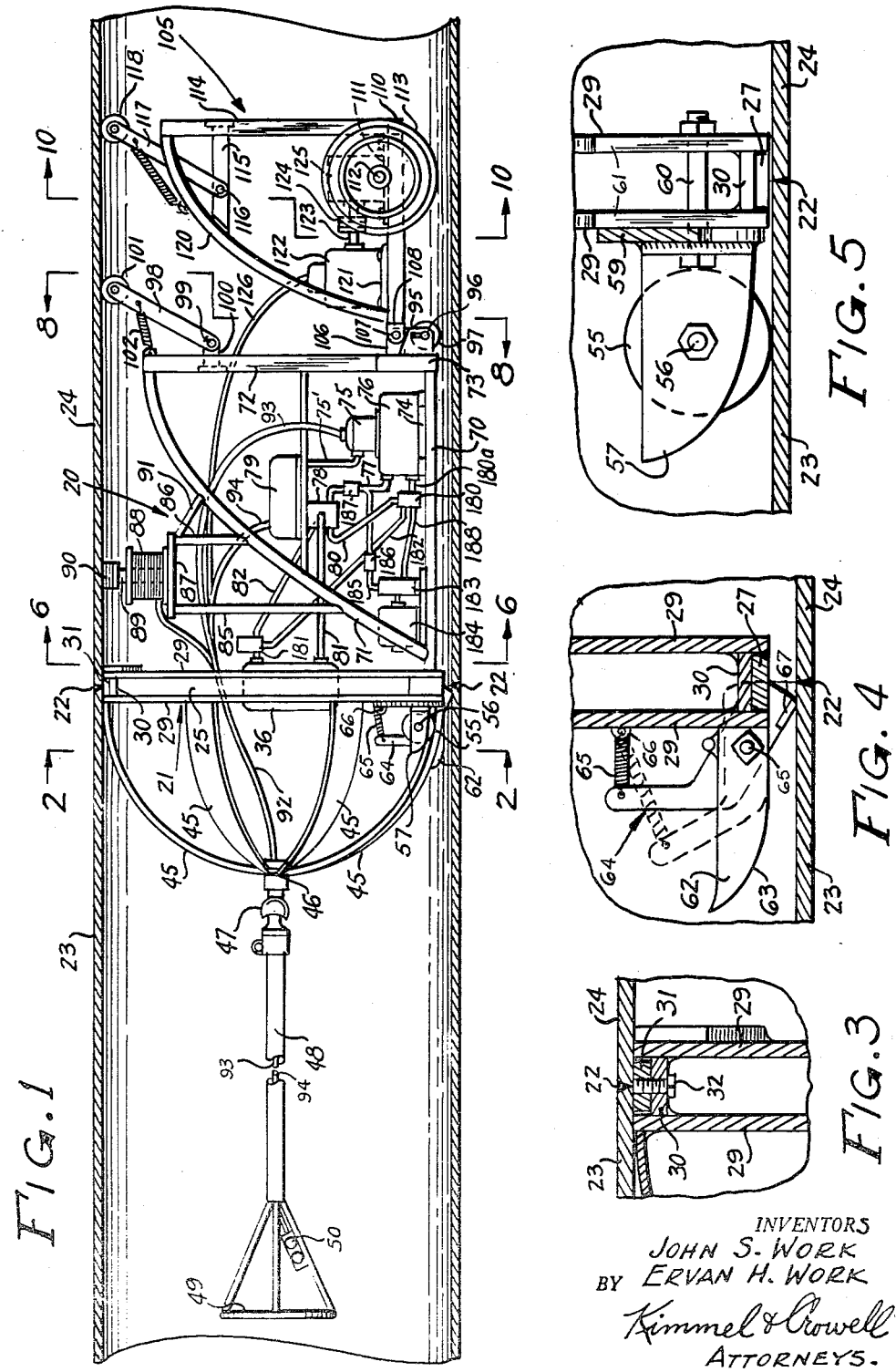
July 27, 1965  J. S. WORK ETAL  3,197,195
INTERNAL EXPANDING LINE-UP PIPE CLAMP
Filed May 25, 1961  4 Sheets-Sheet 1
INVENTORS
JOHN S. WORK
BY ERVAN H. WORK
Kimmel & Crowell
ATTORNEYS.

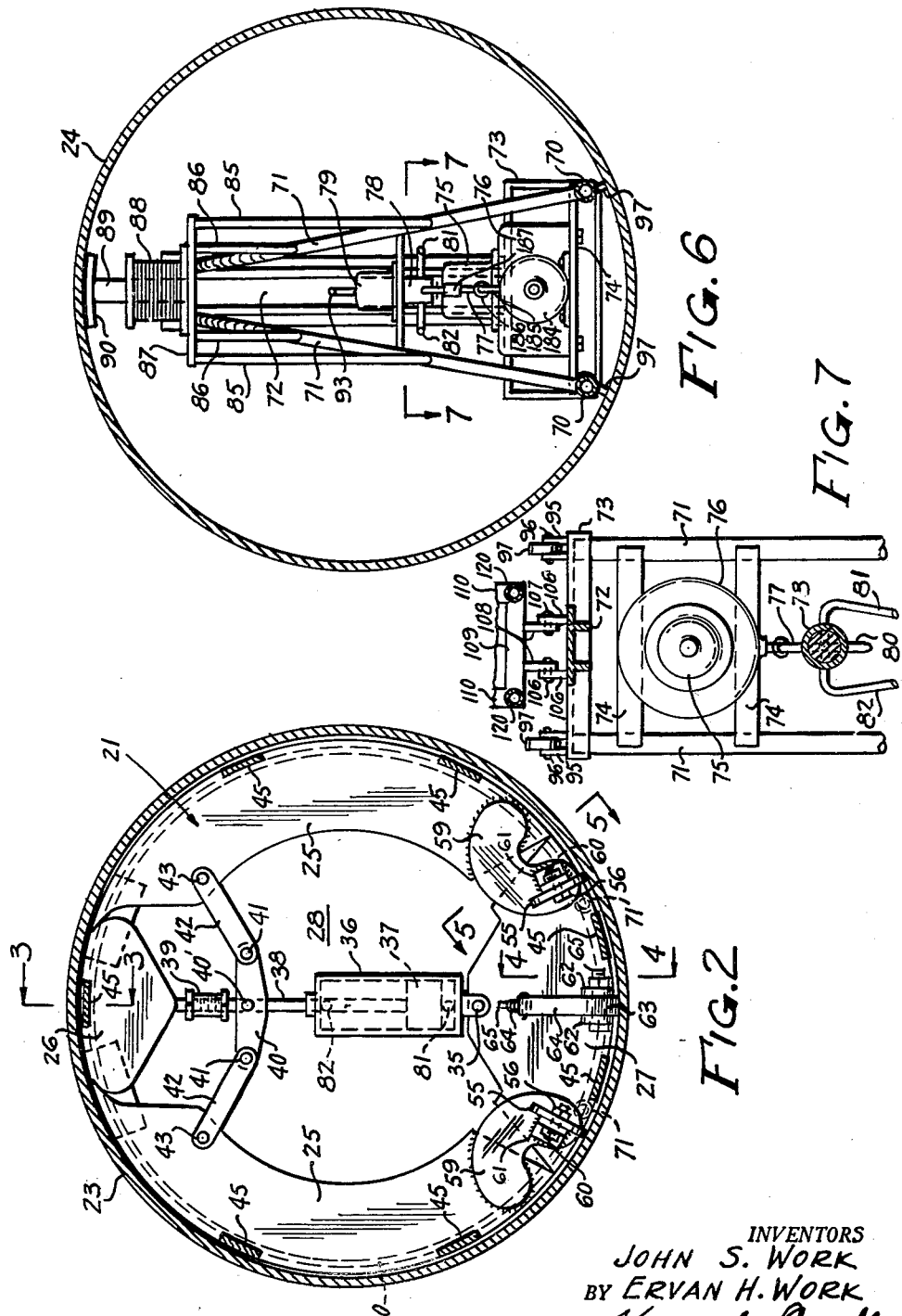

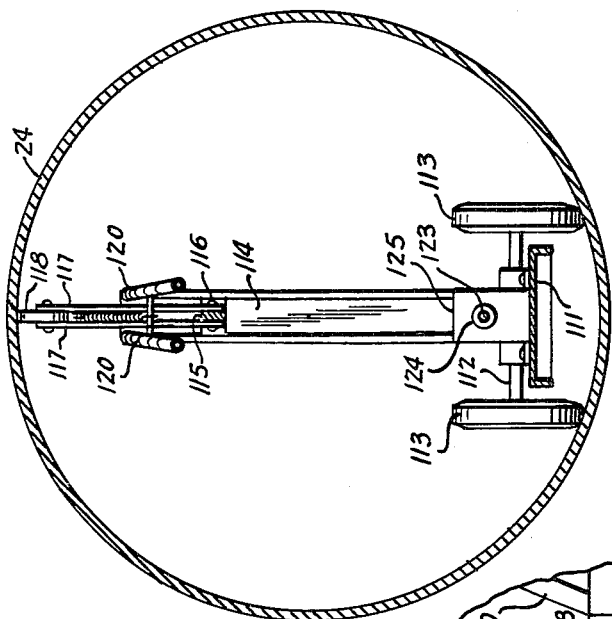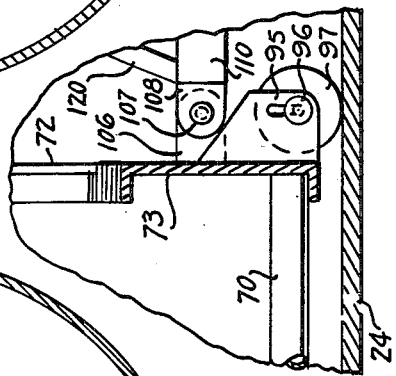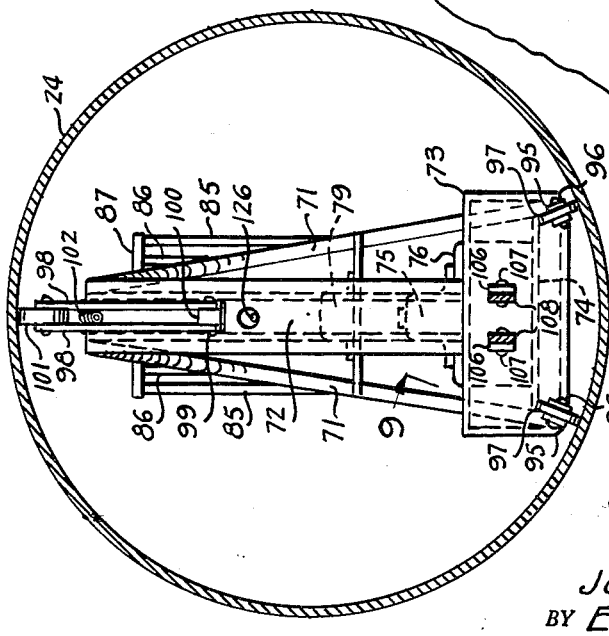

INVENTORS
JOHN S. WORK
BY ERVAN H. WORK

Kimmel & Crowell
ATTORNEYS.

United States Patent Office 3,197,195
Patented July 27, 1965

3,197,195
INTERNAL EXPANDING LINE-UP PIPE CLAMP
John Scott Work and Ervan H. Work, both of
3404 E. 33rd St., Tulsa, Okla.
Filed May 25, 1961, Ser. No. 112,553
6 Claims. (Cl. 269—34)

This invention relates to an internal expanding line-up pipe clamp, and has as its primary object the provision of an improved pipe clamp of this character which will line up adjacent ends of pipes prior to welding the pipes together and maintain the pipes in juxtaposed relation during the welding operation.

An additional object of the invention is the provision of an improved pipe clamp of this character which constitutes an improvement over the pipe clamp shown in my prior Patent No. 2,878,770 issued March 24, 1959.

A further object of the invention is the provision of an internal expanding line-up pipe clamp of this character which is readily portable and which is provided with a self-propelled frame structure for moving the entire clamping assembly interiorly of the pipe.

An additional object of the invention is the provision of an electro-magnetically operated brake or locking mechanism for expanding the clamping shoes interiorly of a pipe to securely clamp the same in position internally of the pipe sections to be welded.

Still another object of the invention is the provision of a retractable front wheel assembly by means of which are the wheels retracted from contact with the interior of the pipe when the clamping mechanism is expanded.

Another object of the invention is the provision of a dog assembly adjacent the bottom of the clamping mechanism to prevent a rearward drifting of the apparatus prior to clamping.

A still further object of the invention is the provision of a four-way electro-magnetically actuated valve mechanism for expanding the clamping mechanism.

Still another object of the invention is the provision of a mechanism of this character having a back-up plate which is preferably of copper, bronze, brass or other non-ferrous metal, plastic or the like, which will stand up under the heat of the welding operation.

A still further object of the invention is the provision of an improved means for self-propulsion of the device, which may be attached and detached from the pipe clamping assembly as desired.

Still another object of the invention is the provision of a device of this character, which is sturdy and durable in construction, reliable and efficient in operation, and relatively inexpensive to manufacture, assemble, and utilize.

Additional objects reside in the combinations of elements, arrangements of parts, and features of construction, all as will be more fully pointed out hereinafter and disclosed in the accompanying drawings, wherein there is shown a preferred embodiment of this inventive concept.

In the drawings:

FIGURE 1 is a side elevational view of one form of device embodying features of the instant inventive concept shown interiorly of a pipe comprised of lengths to be welded, the latter being shown in section;

FIGURE 2 is an enlarged sectional view taken substantially along the line 2—2 of FIG. 1 as viewed in the direction indicated by the arrows;

FIGURE 3 is an enlarged sectional view taken substantially along the line 3—3 of FIG. 2 as viewed in the direction indicated by the arrows;

FIGURE 4 is an enlarged sectional view taken substantially along the line 4—4 of FIG. 2 as viewed in the direction indicated by the arrows;

FIGURE 5 is an enlarged sectional view taken substantially along the line 5—5 of FIG. 2 as viewed in the direction indicated by the arrows;

FIGURE 6 is an enlarged sectional view taken substantially along the line 6—6 of FIG. 1 as viewed in the direction indicated by the arrows;

FIGURE 7 is an enlarged fragmentary sectional view taken substantially along the line 7—7 of FIG. 6 as viewed in the direction indicated by the arrows;

FIGURE 8 is an enlarged sectional view taken substantially along the line 8—8 of FIG. 1 as viewed in the direction indicated by the arrows, certain parts being omitted for the sake of clarity in illustration;

FIGURE 9 is an enlarged sectional view taken substantially along the line 9—9 of FIG. 8 as viewed in the direction indicated by the arrows;

FIGURE 10 is an enlarged sectional view taken substantially along the line 10—10 of FIG. 1 as viewed in the direction indicated by the arrows;

Figure 11:
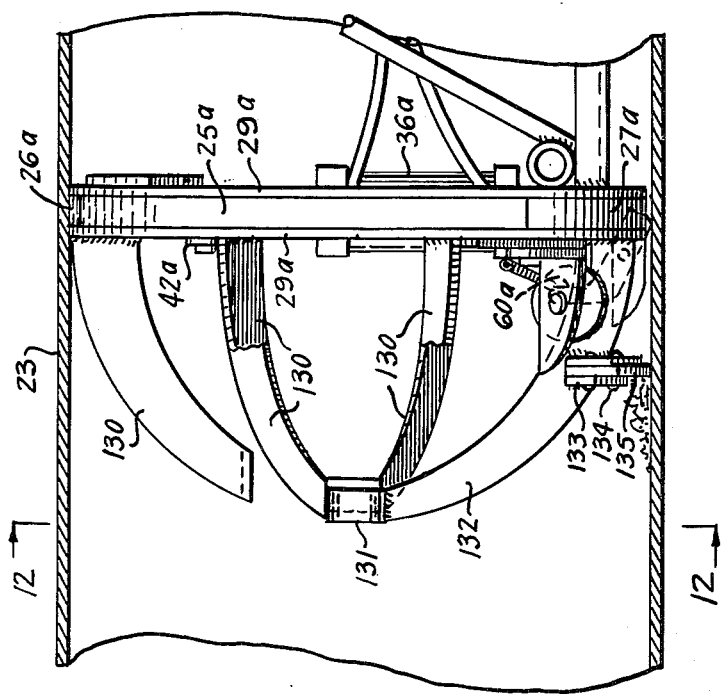
Figure 12:
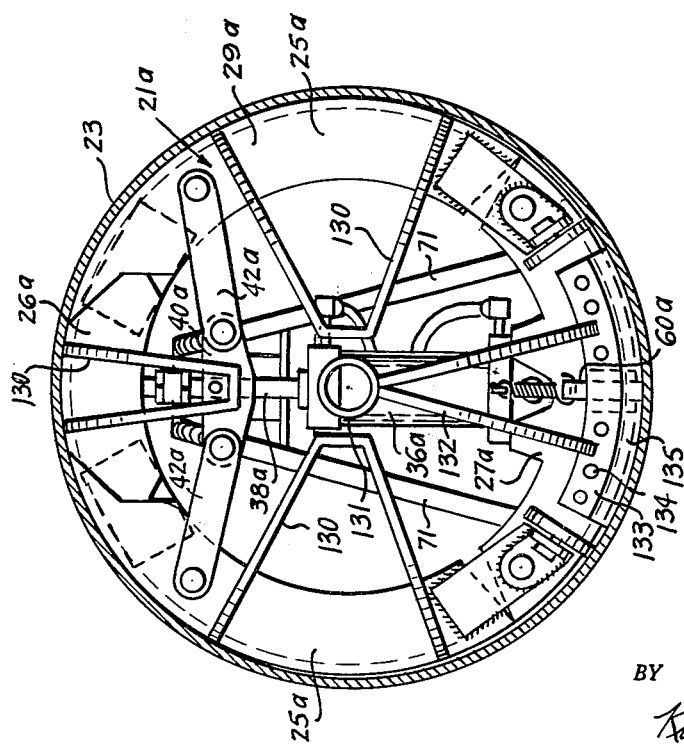

FIGURE 11 discloses a modified form of front end construction wherein the top and bottom clamping sections are slightly different in configuration; and FIGURE 12 is a front view in elevation of FIGURE 11 taken on lines 12—12 in the direction of the arrows.

Similar reference characters refer to similar parts throughout the several views of the drawings.

Having reference now to the drawings in detail, the device is generally indicated at 20 and is comprised of an annular back-up plate, generally indicated at 21, and to be more fully described hereinafter, which is adapted to be located at the well line 22 of a pair of adjacent pipe sections 23 and 24. The back-up plate 21 is comprised of two oppositely disposed arcuate side sections 25 which are substantially identical and a top segment 26 and a bottom segment 27 forming a substantially complete circular plate having an open center 28. Each of the segments includes spaced angular flanges 29 and an internal rim 30, the rim being adapted for the reception of inserts 31 held in position by screws or bolts 32 of FIGURE 3. These inserts are of any desired heat resistant material, such as copper, bronze, brass, or any suitable non-ferrous metal, plastic, or other synthetic product which is sufficiently heat resistant to stand up under the heat produced by the welding operation.

The bottom segment 27 is connected by means of a pin 35 to the bottom of a hydraulic cylinder 36, within which there is a reciprocable piston 37 connected to a piston rod 38. The piston rod 38 is in turn through a threaded adjusting member 39 connected to the top segment 26.

A cross arm 40 is pivotally mounted as on a pivot 40' to the piston rod 38, and has pivotally connected thereto at its opposite ends, as by means of pivots 41, links 42 which are in turn pivotally connected by means of pivots 43 to the side sections 25. The arrangement is thus such that, when the piston 37 is moved hydraulically toward the upper end of the cylinder 36, in a manner to be more fully described hereinafter, all of the sections 25, 26, and 27 move radially outwardly to engage the interior of the pipe sections 23 and 24 adjacent the well line 22.

Extending forwardly from the frame flange 29 there are a plurality of arcuate arms 45, which converge at a forward point in a ring 46, to which there is attached, as by means of a universal joint 47, an operating rod 48 at the extremity of which there is control hand wheel 49. The hand wheel 49 has thereon a plurality of control buttons 50, the purpose of which will be more fully described hereinafter.

Traveling rollers 55 are provided for the device and are mounted on bolts or axles 56 which are secured to forwardly extending arcuate lugs 57, the lugs being attached, as by welding, to crescent-shaped plates 59, which in turn are secured to the lower ends of the opposite side sections 25. Bolts 60 extend through openings 61 in the opposite sides of the bottom segment 27 so that limited sliding movement is permitted the rollers when the side section 25 and bottom segment of the backup plate are moved to clamping position; the rollers being retracted when the side section and bottom segment are in clamping position, and extending to the position of FIGURES 1 and 2 into engagement with the sides of the pipe side section and bottom segment of the back-up plate are retracted to permit the device to travel along interiorly of the pipe.

A braking device is also provided and takes the form of an L-shaped member 60', which is pivotally mounted on a pivot 61 between a pair of forwardly extending lugs 62 and have arcuate under surfaces 63 which serve as skids or guides. The L-shaped member 64 has its upright leg secured, as by a spring 65 to a lug 66 on the front flange 29, and at its lower extremity on the outer face has a tool steel point 67 which is adapted to engage the bottom surface of the pipe through which the apparatus is being moved when the clamping members are in retracted or traveling position. When the clamping members and particularly the lower segment 27, are expanded, the braking device assumes the position shown in dotted lines in FIG. 4, substantially flush with the frame so as to be out of the way.

Extending rearwardly from the inner or rear flange 29 there are a pair of lower supporting members 70, from which a pair of arcuately disposed upwardly positioned supporting members 71 extend rearwardly and convergingly upwardly to the top of a vertically positioned plate 72, which is supported on a transversely positioned plate 73 and secured between the ends of the members 70. A supporting plates 74 is provided across the members 70 adjacent their rear ends and moves an electric motor 75. This motor 75 is controlled by one of the push buttons 50 through a cable 93. An air motor may be substituted for electric motor 75, if desired.

The motor 75 operates a hydraulic fluid pump in a casing 76, from which a line 77 leads to a four-way valve 78, which is electrically actuated through a valve motor 79. A return line 80 leads to a multiple valve 180 from which a line 180a leads back to casing 76. From valve 78 a line 81 leads to one end of the hydraulic cylinder 36 and a second line 82 leads to the opposite end thereof through a pressure relief valve 181 for actuating piston 37 to unclamp or clamp the several clamping sections 25—25, 26 and 27. A return line 182 extends from relief valve 181 to multiple valve 180. An auxiliary or booster pump 183 is driven by an electric motor 184 and has connected thereto a pressure line 185, which extends through a check valve 186 to line 77, the latter being also provided with a check valve 187. A return line 188 extends from the multiple valve 180 back to booster pump 183. Suitable electric connections (not shown) are provided for both pumps and the booster pump 183 is cut in, when the clamping sections are moved into position, to accelerate this action. The main pump 76 provides sufficient pressure for holding the device after the initial clamping action.

A front pair of uprights 85—85 are secured to the arcuate supporting members 71, and also a rear pair of uprights 86—86 which together serve to support a platform 87, on which there is mounted an electromagnet 88. The plunger 89 of this electro-magnet has attached to the end thereof a braking disc 90, which abuts the assembly against the wall of the pipe interiorly thereof.

Reinforcing members 91 extend between the arcuate supporting members 71—71 and the platform 87. Electrical power is supplied to the electro-magnet 88 through an electrical cable 92, and similarly electrical power is supplied to the main pump motor 75 and switch actuator 79 through the conduit 93 and a cable 94.

At the bottom of the plate 73 there is a pair of rearwardly extending lugs 95—95 on opposite sides of the vertical center line, which mount axles 96 having thereon rollers 97, which serve to support the rear end of the frame interiorly of the pipe.

An arm 98 is pivoted as at 99 to a rearwardly projecting lug 100 on the vertically positioned plate 72, and carries at its upper end a roller, 101 which bears against the top of the pipe. A coil spring 102 is connected between the arm 98 and the plate 72 and biases the roller 101 upwardly into engagement with the top of the pipe.

A self-propelling attachable and detachable unit, generally indicated at 105, is secured to the rear of the frame, a pair of lugs 106 being provided on the transversely positioned plate 73 for attachment by means of pivot pins 107 of corresponding lugs 108 which are mounted on a base frame 109 of the propelling unit. Frame 109 includes two rearwardly extending members 110—110, upon which there is mounted a plate 111 having thereon an axle 112, which at its outer ends is supported on driving wheels 113—113. An upright 114 at the rear end of the frame of the device has secured thereto a longitudinally extending bar 115, which pivotally supports on a pivot 116 an arm 117 carrying at its upper extremity a roller 118, which engages the upper surface of the pipe for biasing the driving wheels 113 into contact with the lower surface. Arcuate supporting members 120—120 extend rearwardly from the top of upright 114 to the forward extremities of the members 110.

A second plate 121 is mounted on the rearwardly extending members 110—110 and carries an electric driving motor 122 which, through a shaft 123 and a clutch 124, drives gearing in a gear box 125 and the latter in turn transmits motion to the axle 112 for driving the wheels 113—113. Electrical power is supplied to the driving motor 122 through a cable 126. The entire operation of the device may be controlled by suitable buttons 50 previously located, as described. Obviously, an air motor supplied with air under pressure through a suitable line may be substituted for the electric drive motor 122, if desired.

FIGS. 11 and 12 disclose a modified form of front end construction, wherein the top and bottom clamping sections 26a and 27a are slightly different in configuration, as are the side plates 25a. The latter however have the flanges 29a thereon as before. They are, however, operated in the same manner by a substantially identical linkage comprised of links 42a and a central link member 40a mounted on a piston shaft 38a, which is operated by a cylinder 36a in the same manner as that previously described. A braking member, generally indicated at 60a, is similarly provided.

The forwardly extending arcuate arms 130 differ from those previously described in being arcuate through their thicker dimension, rather than flat as in the previous modification. In this modification a sleeve 131 may be employed to supplant the ring 46, and the device may, if desired, be controlled from the other end. Also in this modification of the device, a pair of depending arcuate members 132 carry at their lower extremities a steel plate 133 provided with bolt holes through which pass bolts 134 for the purpose of securing to the underside of the plate 133 a length of leather belting 135, or similar element which is arcuate in configuration and which is adapted to sweep the lower inner side of the pipe ahead of the clamping ring in order to ensure a clean pipe.

From the foregoing it will now be seen that there is herein provided an improved internal expanding line-up pipe clamp which may be advantageously utilized in backing up an external weld for two aligned pipe sections, which is self clamping, and which will lock securely in position, which is precluded against retrograde movement, which is provided with traveling wheels, which has attached thereto a self-propelling attachment, and which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

We claim:

1. An internally expanding line-up clamping assembly for holding in alignment adjacent pipe sections to be welded together comprised by a first frame and a second frame detachably secured together for travel through the aligned pipe sections, arcuate pipe engaging elements mounted at the end of the first frame opposite the juncture with the second frame and radially movable into and out of engagement with the aligned pipe sections, a servo-cylinder mounted on the first frame and operatively connected to said arcuate pipe engaging elements for forcing same radially outwardly into and withdrawing same inwardly from engagement with the aligned pipe sections, and a fluid pressure system mounted on the first frame and connected to said servocylinder for operating the latter in its inward and outward movements, rollers at the front and rear ends of the first frame for facilitating the travel of the assembly through the aligned pipe sections, drive wheels on the end of the second frame opposite the juncture with the first frame, a motor mounted on the second frame and a transmission between the motor and the drive wheels.

2. An internally expanding line-up clamping assembly for holding in alignment adjacent pipe sections to be welded together comprised by a first frame having an upright plate at its rear end, a plurality of arcuate pipe engaging elements, a second frame also having an upright plate at its rear end and detachably secured at its front end to the rear end of the first frame, a spring biased stabilizing roller mounted on the upright plate on the first frame for engagement with the walls of the aligned pipe sections through which the assembly travels, a spring biased stabilizing roller mounted on the upright plate on the second frame and also engageable with the walls of the pipe sections through which the assembly travels, a servo cylinder mounted on the first frame and operatively connected to said arcuate pipe engaging elements for forcing same outwardly into and withdrawing same inwardly from engagement with the aligned pipe sections, and a fluid pressure system mounted on the first frame and connected to said servo cylinder for operating the latter in the inward and outward movements, rollers at the front end of the first frame and at the juncture of the first and second frames for facilitating the travel of the assembly through the aligned pipe sections, drive wheels on the end of the second frame opposite the juncture with the first frame, a motor mounted on the second frame, and a transmission between the motor and the drive wheels.

3. An internally expanding line-up clamping assembly for holding in alignment adjacent pipe sections to be welded together comprised by a first frame having an upright plate at its rear end, a second frame also having an upright plate at its rear end and detachably secured at its front end to the rear end of the first frame, a spring biased stabilizing roller mounted on the upright plate on the first frame and positioned along the vertical axis of the assembly for engagement with the walls of the aligned pipe sections through which the assembly travels, a spring biased stabilizing roller mounted on the upright plate on the second frame and positioned along the vertical axis of the assembly for engagement also with the walls of the aligned pipe sections through which the assembly travels, arcuate pipe engaging elements mounted at the front end of the first frame and radially movable into and out of engagement with the aligned pipe sections, a servo cylinder mounted on the first frame and operatively connected to said arcuate pipe engaging elements for forcing same outwardly into and withdrawing same inwardly from engagement with the aligned pipe sections, and a fluid pressure system mounted on the first frame and connected to said servo cylinder for operating the latter in its inward and outward movements, rollers at the front end of the first frame arcuately spaced on the opposite sides of the vertical center line of the assembly for in part facilitating the travel of the assembly through the aligned pipe sections, rollers at the juncture of the frames also arcuately spaced on the opposite sides of the vertical center line of the assembly for further facilitating the travel of the assembly through the aligned pipe sections, drive wheels on the end of the second frame opposite the juncture with the first frame, a motor mounted on the second frame, and a transmission between the motor and the drive wheels.

4. An internally expanding line-up clamping assembly for holding in alignment adjacent pipe sections to be welded together comprising a closed box like first frame means; a cooperating self propelled unit means including a second frame means having upper guiding roller means and lower driving roller means mounted thereon, cooperating plural linkage means pivotally and detachably connecting said self-propelled unit means to the lower back end of said first frame means; a plurality of roller means mounted on the rearward end of said first frame means and cooperating with said driving roller means for facilitating the travel of the assembly through the aligned pipe sections; a substantially coplanar internal pipe alignment clamp means mounted at the front end of said first frame means, said alignment clamp means comprising a plurality of hinged together arcuate radially clamping shoe means and radial linkage means actuating said shoe means; electromagnetic brake means to coact with the internal surface of one of said aligned pipe members, roller means mounted on the front end of said first frame means, said brake means being mounted on said first frame means intermediate said front roller means and said rearward roller means for engaging the internal side walls of the pipe sections opposite the location of said roller means, and an electrical energy means for selectively energizing said brake means.

5. An internally expanding line-up clamping assembly for holding in alignment adjacent pipe sections to be welded together as in claim 4 including a first motor means, and gear box means cooperating with said propelled roller means, a second motor means and hydraulic means cooperating with said radial linkage means to actuate said radially clamping shoe means.

6. An internally expanding line-up clamping assembly for holding in alignment adjacent pipe sections to be welded together as in claim 4 including a hand wheel for steering the assembly through the aligned pipe sections, and control means for selectively controlling said first motor means, said second motor means and said brake means mounted on said hand wheel means.

References Cited by the Examiner

UNITED STATES PATENTS

| | | | |
|---|---|---|---|
| 2,408,255 | 9/46 | Elliott | 113—103 |
| 2,594,000 | 4/52 | Elliott | 113—103 |
| 2,638,069 | 5/53 | Mearns | 113—103 |
| 2,692,354 | 10/54 | Fisher | 317—191 |
| 2,804,836 | 9/57 | Tiedemann | 113—103 |
| 2,830,551 | 4/58 | Miller | 113—102 |
| 2,878,770 | 3/59 | Work et al. | 113—103 |
| 2,887,972 | 5/59 | Handley | 113—102 |
| 2,906,226 | 9/59 | Myrick et al. | 113—103 |
| 2,935,656 | 5/60 | Baker | 317—191 |

CHARLES W. LANHAM, Primary Examiner.

JOHN P. CAMPBELL, MICHAEL V. BRINDISI,
Examiners.